(12) United States Patent
Karam

(10) Patent No.: US 8,886,973 B2
(45) Date of Patent: Nov. 11, 2014

(54) SYSTEM EMPLOYING SIGNALING AT A POWERED COMMUNICATIONS INTERFACE TO MODIFY OR OVERRIDE A POWER-WITHHOLDING POLICY AT A POWER-SOURCING EQUIPMENT

(75) Inventor: Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1684 days.

(21) Appl. No.: 12/193,287

(22) Filed: Aug. 18, 2008

(65) Prior Publication Data

US 2010/0042855 A1 Feb. 18, 2010

(51) Int. Cl.
*G06F 1/26* (2006.01)
*H04L 12/10* (2006.01)

(52) U.S. Cl.
CPC . *G06F 1/26* (2013.01); *H04L 12/10* (2013.01)
USPC .......................................... 713/310; 713/300

(58) Field of Classification Search
CPC ..... G06F 1/3203; G06F 1/3209; G06F 1/325; G06F 1/266
USPC ........... 709/224, 230; 713/300, 310, 320, 324
See application file for complete search history.

(56) References Cited

U.S. PATENT DOCUMENTS

| | | | |
|---|---|---|---|
| 2004/0268160 A1* | 12/2004 | Atkinson et al. | 713/300 |
| 2005/0047431 A1* | 3/2005 | Binder | 370/463 |
| 2006/0082220 A1 | 4/2006 | Karam | |
| 2006/0168459 A1* | 7/2006 | Dwelley et al. | 713/300 |
| 2006/0271678 A1* | 11/2006 | Jessup et al. | 709/224 |
| 2007/0038769 A1* | 2/2007 | Ryan et al. | 709/230 |
| 2007/0132487 A1* | 6/2007 | Kestelli | 327/108 |
| 2007/0288784 A1* | 12/2007 | Koper et al. | 713/324 |
| 2009/0222678 A1* | 9/2009 | Yu et al. | 713/300 |
| 2009/0235096 A1* | 9/2009 | Thomas et al. | 713/310 |

* cited by examiner

*Primary Examiner* — Kim Huynh
*Assistant Examiner* — Brandon Kinsey
(74) *Attorney, Agent, or Firm* — Novak Druce Connolly Bove + Quigg LLP

(57) ABSTRACT

A power-sourcing equipment (PSE) has a powered communications interface to which a powered device (PD) is coupled. The PD presents a valid PD signature indicating that the PD is attached and capable of receiving normal operating power from the PSE. Per a power-withholding policy, the PSE operates in a power-withholding state to withhold the normal operating power notwithstanding the valid PD signature, and monitors for a signal via the powered communications interface indicating that the normal operating power should be delivered to the PD. The signal may be an alternative signature generated by a user-activated switch for example. In response to receiving the signal in the power-withholding state, the PSE enters a power-providing state in which it provides the normal operating power to the PD notwithstanding the power-withholding policy. An intermediate device (dongle) may be employed to generate the signal.

34 Claims, 9 Drawing Sheets

SYSTEM EMPLOYING SIGNALING AT A POWERED COMMUNICATIONS INTERFACE TO MODIFY OR OVERRIDE A POWER-WITHHOLDING POLICY AT A POWER-SOURCING EQUIPMENT

BACKGROUND

The invention pertains to the field of communications interfaces via which DC power is provided to operating circuitry.

Powered communications interfaces are utilized in data communications systems to provide operating power to devices over the same wires used to carry data communications signals, in a manner analogous to the traditional telephone system in which DC operating power is provided to subscriber equipment over the twisted-pair telephone wires. Today, there is widespread use of so-called "power over Ethernet" or POE technology, in which DC operating power is provided to digital telephones, video cameras, and other data terminal equipment over unshielded twisted pair (UTP) cables connecting the data equipment with centralized data switches. In POE parlance, a device receiving power in this fashion is termed a "powered device" or PD, while a device that provides power for use by PDs is termed a "power sourcing equipment" or PSE.

According to applicable POE standards, a PSE must detect and classify a PD before PSE power is delivered to the PD. The PD presents a 25 kΩ signature resistor (R-signature) to a PSE to request the delivery of POE power. During the detection process, a PSE successively applies relatively low voltages V1 and V2 (less than 30 V) while measuring corresponding currents I1 and I2 conducted by the PD, then it calculates a resistance value R-signature=(V2−V1)/(I2−I1). If this calculation yields an R-signature in a suitable range about 25 kΩ (the valid identity network for a PD requesting power), the PSE proceeds to a classification process to ascertain the power requirements of the PD. The PSE applies a voltage in the range of 15 v-20 v while measuring the current drawn by the PD, and then uses the current value to classify the PD according to a set of values specified in the standard. Traditionally the standard allows 5 classes (labeled 0 to 4), and a more recent version of the standard allows for additional devices that require higher power than previously defined. Other PD detection techniques are also known. For example, PD detection may also be carried out using differential loopback of a communications signal from a PD using two wire pairs, or using a single-pair identity network and appropriate signaling and detection.

Conventionally, once detection and classification are complete, a PSE automatically applies full power (48 volts and a class-based maximum current) to the PD via the powered communication interface as long as the PSE has sufficient incremental power available to do so. The PD uses this POE power to operate. In many cases, the 48 V power is supplied to one or more DC-DC converters in the PD which transform the 48 V power into other specific operating voltages as required by the PD operating circuitry, such as +/−15 V, +3.3 V, etc. In particular, the 48 V power is used to provide power to communications circuitry within the PD that effects high-speed data communications to/from the PD over the same twisted pairs used to carry the POE power. This circuitry is commonly referred to by the term PHY, referring to its "physical layer" communications functionality according to the well-known hierarchical description of data network communications.

BRIEF DESCRIPTION OF THE DRAWINGS

Certain objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
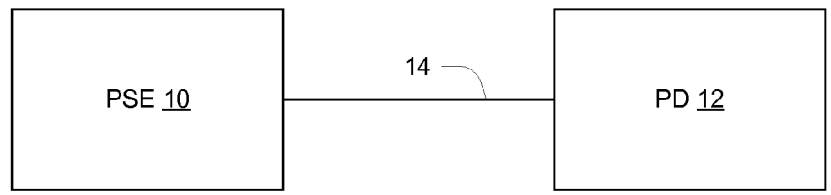
FIG. 1 is a block diagram of a system employing a powered communications interface according to an embodiment of the invention.

In systems employing powered communications interfaces, such as POE systems, there can be a need for communications to/from a powered device before the powered device is receiving power from the power sourcing equipment. As but one example particularly applicable to POE systems, the power sourcing equipment may be operating in accordance with a power conservation policy such that under certain conditions it refrains from supplying power to a powered device even when detection and classification indicate the presence of a valid PD that requires power. For example, power may be withheld during non-working times or whenever a user associated with the powered device is known to be absent, in the interest of reducing system power consumption. During such times when power is being withheld, it may be useful to enable a powered device to supply a signal to the power sourcing equipment indicating that conditions have changed (e.g., the user is now present) or that there are special conditions that override the policy (such as an emergency). However, such communications are generally not possible in traditional POE systems, because (1) the normal signaling that occurs in the absence of power is limited to detection and classification only, and (2) the circuitry that could be used for communications (such as PHY circuitry) is not receiving operating power, and therefore cannot be used for such signaling. Thus, traditional POE systems suffer from the inability to effect communications between a power sourcing equipment and a powered device when normal operating power is not being supplied to the PD via the powered communications interface.

A system and method are disclosed in which a power-sourcing equipment (PSE) has a powered communications interface via which the PSE can deliver normal operating power, and a powered device (PD) is coupled to the powered communications interface of the PSE. In operation, the PD presents a valid PD signature to the powered communications interface indicating that the PD is attached and capable of receiving the normal operating power from the PSE.

The PSE is operative, in accordance with a power-withholding policy, to operate in a power-withholding state in which the PSE (a) withholds the normal operating power from the PD notwithstanding the presentation of the valid PD signature by the PD and (b) monitors for the receipt of a signal via the powered communications interface indicating that the normal operating power should be delivered to the PD via the powered communications interface. In response to receiving the signal in the power-withholding state, the PSE enters a power-providing state in which the PSE provides the normal operating power to the PD notwithstanding the power-withholding policy. By the disclosed technique, a system can support power-withholding policies while enabling the policy to be modified or overridden by signaling from the PD (such as by a user or remote sensor) as operating conditions warrant.

Description of Example Embodiments

FIG. 1 illustrates a system employing a powered communications interface in the form of a four-pair Ethernet connection including circuitry supporting the delivery of both communications and power between a power-sourcing equipment (PSE) 10 and a powered device (PD) 12 over a cable 14. The cable 14 includes eight wires arranged as four twisted pairs, often referred to as pairs (3,6), (1,2), (4,5) and (7,8) reflecting a numbering of individual connections of an RJ45 jack or plug that terminates each end of the cable 14. In one common configuration, one set of two pairs (e.g. (3,6) and (1,2)) provides a first full-duplex high-speed communications channel, i.e., one pair of the set carries data in one direction while the other pair carries data in the opposite direction, and the other set of two pairs (e.g. (4,5) and (7,8)) is either unused or provides a second full-duplex high-speed communications channel. Data is conveyed on each pair by differential signaling at high-speed rates such as 100 megabits per second, 1 gigabit per second, etc. Within the PSE 10 and PD 12, transformers (not shown) perform AC coupling of the data signals between the cable 14 and respective physical-layer (PHY) integrated circuits that carry out high-speed communications functions. Additionally, each set of two pairs of wires also forms part of a respective first or second power delivery channel. For example, a first power delivery channel includes pairs (3,6) and (1,2), and a second power delivery channel includes pairs (4,5) and (7,8).

In the PSE 10, power circuitry (not shown in FIG. 1) for each power delivery channel includes components that provide DC power to the PD 12 via the cable 14, specifically by generating a DC voltage of nominally 48 volts DC and applying this voltage across the twisted pairs of the power delivery channel, and generating a corresponding DC current which flows in the twisted pairs of the power delivery channel. The power circuitry of each channel also includes control circuitry for controlling operation in accordance with POE specifications, as well as control circuitry that performs additional functions as specifically described herein.

Similarly in the PD 12, power circuitry (not shown in FIG. 1) of each power delivery channel includes components that receive DC power from the PSE 10 via the cable 14 for use within the powered device. Typical components include a DC-DC converter, protection circuitry, etc. The power circuitry also includes control circuitry that controls the flow of DC power from the cable 14 to the power circuitry in accordance with POE specifications, as well as control circuitry that performs additional functions as specifically described herein.

There can be a need to detect and communicate with PD devices without applying POE voltages above 30 volts; such functionality may prove very useful for end users and network administrators alike. Communications improves the performance and capabilities of POE systems. There may be many applications for additional detections and communications. In one example involving a power-management strategy, there may be a need to shut down a PD to save energy. This leaves such a device without its PHY-based communications. Support for communications and additional detections in this powered-off operating condition can enable an end-user to request power at will, especially when a device is powered down and is constantly presenting a valid 25 k identity network to an attached PSE. To implement such a "green-POE" policy (power down devices to conserve energy), the PSE 10 is ordered to hold back its 48 v POE power even while the PD 12 may be presenting a valid signature to the PSE 10. The order may be provided by some higher-level control mechanism such as system software, network administrator, etc. A user would preferably receive an indication about the status of the device, i.e. that the device is visible to the network and is powered down due to a green-POE policy, and in return the user is given the means to communicate back to the PSE 10 the need for modifying or overriding the policy.

A new identity network is used to signal the presence of the user to the PSE 10 doing detections while attached to a PD presenting a 25 k valid signature. One example of such an identity network can be made using a push-button at the PD 12. Using a normally closed switch in series with a 25 k resistor, a signature of (25 k)-(open)-(25 k) can be obtained which corresponds to the sequence of (not pressed)-(pressed)-(not pressed) for the button. The PSE 10 detects the change in the value of the identity network from a 25 k resistor to an open and back to a 25 k resistor again, and this pattern represents a new identity network indicating the presence of a person or the need for supplying immediate POE power. Another example of such a new identity network is the detection of a 25 k resistance followed by a short (maximum current) followed by a 25 k resistor, which can be provided by a normally-open switch in parallel with the 25 k signature resistor. Other identity networks may be realized as changes in classification currents or detection-signatures, or both, due for example to the trigger of circuitry using sensors (light, motion and sound sensors) which might be powered from the PSE 10 at voltages less than 30 v, while the PSE 10 is awaiting a signal before applying POE power again.

Figure 2:
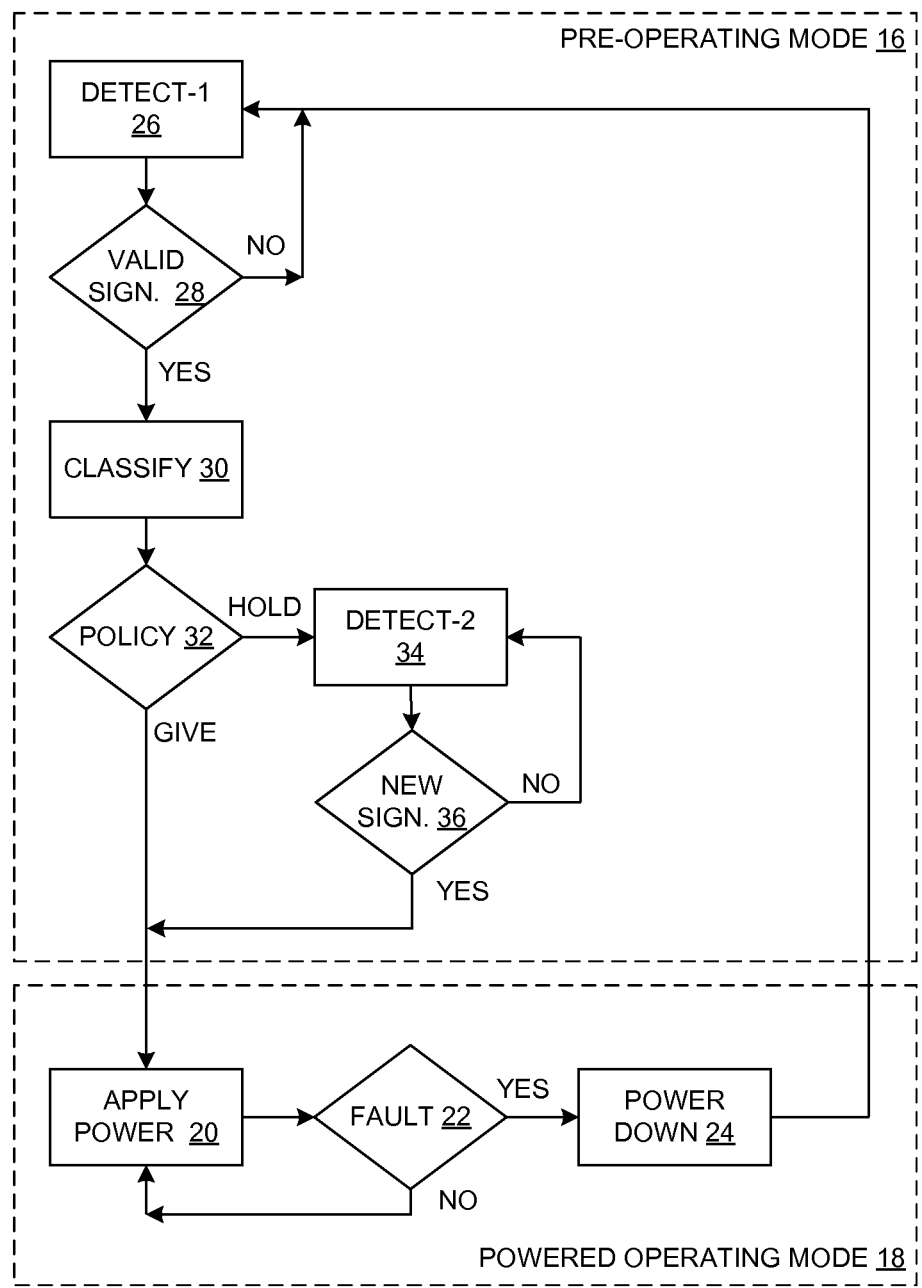
FIG. 2 is a flow diagram depicting a first method of operation of the system of FIG. 1 according to a one embodiment.

FIG. 2 illustrates certain power-delivery operation of the circuitry of FIG. 1. Operation is shown as divided between a pre-operating mode 16 and a powered operating mode 18. In the powered operating mode 18, the PSE 10 provides full operating DC power (e.g. 48 VDC) to the PD 12 via the cable 14, and the PD 12 receives the DC power and makes it available for use within the PD 12 (e.g., by providing operating power to its PHY or similar circuitry). In the pre-operating mode 16, such full POE power is not being supplied. One important purpose of the pre-operating mode 16 is to test for certain conditions to determine whether it is safe for the PSE 10 to supply full DC power to the cable 14. For example, the PSE 10 tests for the presence of the 25 k signature resistor connected to the cable 14, which indicates whether the PD 12 is connected, and further tests for a classification current that indicates a particular power class of the PD 12. Beyond these functions, the PSE 10 and PD 12 may engage in additional signaling for additional functions, examples of which are described more particularly herein.

More specifically, in the powered operating mode 18, the PSE 10 provides full DC power to the cable 14 at step 20. Under these conditions the full 48 volt supply voltage is provided to the power delivery channel, and a corresponding supply current is supplied to the power delivery channel as dictated by the load at the PD 12, subject to current limits and protections enforced by the PSE 10. While power is being supplied, the PSE 10 also checks for a fault condition as shown at 22. Examples of such fault conditions include an open-circuit or short-circuit condition. If no fault is detected, then power continues to be supplied at 20. When a fault condition is detected, then at 24 the PSE 10 powers down the channel, i.e., disconnects the DC supply from the cable 14, and then re-enters the pre-operating mode 16.

In the pre-operating mode 16, at step 26 the PSE 10 performs a first detection operation to determine whether the PD 12 is connected to the cable 14. In the POE specifications, a detection consists of supplying two distinct DC voltages V1, V2 to the cable 14, measuring the resulting currents I1 and I2, and performing a calculation. In particular, the PSE 10 performs the calculation $(V2-V1)/(I2-I1)$. At step 28, the PSE 10 determines whether the result represents a valid signature, i.e., whether the result is within an acceptable range around the value of $2.5 \times 10^4$ (corresponding to a 25 kΩ resistive network specified in the standard). If so, then the presence of the PD 12 is deemed to have been detected, and operation continues to step 30; otherwise detection has failed and is simply repeated beginning again at 26. The values of V1 and V2 are specified to be less than 10 volts DC at the PD, well below the operating voltage of 48 volts.

In step 30, the PSE 10 performs a classification operation in which it supplies a voltage in the range of 15-20 volts and measures the resulting current. Under the POE standards, different values of the current correspond to different classes of device with respect to the maximum amount of POE power drawn by the device. Under the original standard known as IEEE 802.3af, five classes were defined. Under a newer standard known as IEEE 802.3at, the number of classes is expanded and the classification operation involves the use of two successive classification voltages.

For purposes of this description, the result of a detection and/or classification is variously termed a "signature" or an "identity network". Both terms refer to the relationship between a voltage or voltages supplied by the PSE 10 and a corresponding current or currents conducted by the PD 12 (and supplied by the PSE 10). The PD can be said to present a different "signature" or "identity network" to the cable 14 by virtue of corresponding different currents supplied and measured by the PSE 10 at the same voltage or voltages.

In conventional operation of POE systems, upon completion of both detection and classification, the PSE immediately commences supplying 48 volt power to the cable. In the embodiment of FIG. 2, it is assumed that the PSE 10 is capable of different behavior. In particular, it is assumed that the PSE 10 can be controlled to intentionally withhold power even upon successful completion of detection and classification at steps 26-30. This operation may be controlled by system software, for example, and may be utilized in furtherance of a power conservation scheme or some other goal. As a particular example, the system software may configure the PSE 10 to withhold power during particular (e.g., non-working) hours, or under other particular circumstances, in order to conserve power. Several specific examples of power-management policies are described below.

Thus, upon completion of classification at step 30, operation continues to step 32 in which the PSE 10 takes further action based on a currently active power-management policy, specifically whether or not the current policy includes withholding power, i.e., intentionally not supplying power to the cable 14. If the policy is not to withhold power (as indicated by the branch labeled GIVE), then the PSE 10 enters the powered operating mode 18, which is described above.

If at step 32 the policy of the PSE 10 is to withhold power (as indicated by the branch labeled HOLD), then the PSE 10 proceeds to step 34 in which it performs a second detection for a new signature, i.e., a signature different from the one found at steps 26-28. As an example, the PSE 10 may check for a specific resistance other than 25 kΩ, or an open circuit (minimum current), short circuit (maximum current), or pattern as discussed above. The PSE 10 remains in the loop of steps 34-36 (continuing to withhold power) until the new signature is detected at step 36, at which time it enters the powered operating mode 18. By this operation, power can be withheld indefinitely in accordance with the active power-management policy. But it is also possible for this operation to be overridden by presenting the new signature. This mechanism can be used in a variety of ways to enable certain system-level functionality. For example, the PD 12 may have a control (such as a switch) that can be user-activated, enabling a human user to provide a signal to the PSE 10 indicating that it should provide power. Alternatively, a sensor or similar automatic device might be used to generate the new signature under certain conditions. Such sensor or device would use detection and classification power to activate itself. Under POE standards, there are limits of 10 volts and 5 mA on the voltages and currents allowed during detection, but classification can supply higher power for a brief period of time. The PSE may be designed to increase the power during detection and classification to increase the power available if needed. Several specific examples are described below.

There are potentially many different kinds of power-management policies that can be employed in the system including the PSE 10 and PD 12. Some policies might apply to all PDs whereas some might be class-based policies that apply to certain types of PDs or certain uses of PDs. The following is a list of potential class definitions for PD devices.

a—Intrinsically green PD (never shut down mission critical device)
b—Overnight class (PSE automatically powers device down based on a predetermined time window, which may be user programmable)
c—Week-end class (device is powered down Friday night through Monday morning)
d—Extended-Time class (power down related to vacation or other extended absence, can be tied into system application software having such information)
e—Enable power-down via a call manager application (user can call his/her own phone number to power phone down or up)
f—No longer used class (employee left)
g—On-Activity class (powered up if data port is active, otherwise powered down)
h—Combinations of the above classes
i—User programmable class
j—Calendar based class (device is powered down if calendar application indicates user is absent for sufficiently long)
k—Sensor based class (supply/withhold power based on motion, light, temperature or other sensor, e.g. in a conference room or break room)
l—Handset lifted or speaker/headset class
m—Remote control class. This ties into the push button.

n—Voice activated class.
o—Fingerprint reader
p—IR activated class
q—Reserve power class Generally, power management policies may employ distinct criteria for withholding normal operating power. Broadly speaking, different policies may employ distinct types of criteria including time-based criteria (e.g., (b) and (c) above), calendar-based criteria (e.g., (j) and perhaps (d) above), activity-based criteria (e.g., (g) above)), and sensor-based criteria (e.g., (k) above).

For many of the above policies, it is desirable to be able to bypass such policy on demand. For example, a user who must work on a weekend may need to use a weekend-class device. In this case, the user must be able to inform the system that power is needed at a time when power was not expected to be supplied, and the system should respond by applying power notwithstanding the active policy that would otherwise result in power being withheld. Of course, such an override feature may have security implications, and thus upon receiving such a request for power the system may query the user for a password or other authentication before permitting powered use of the PD 12.

It should be noted that whatever mechanism is used to enable a user to signal the need for power (overriding the policy), the same mechanism may also be used to enable the user to shut the power down and re-activate the policy.

The signature detection steps 26-28 and 34-36 of FIG. 2 detect corresponding signatures presented by the PD 12 to the cable 14. Circuit techniques for presenting an individual signature are generally known in the art, and may include for example connecting a 25 kOhm resistor across the transformer centertaps of the two pairs that make up one POE delivery channel. In order to present multiple signatures to effect the above-described signaling, the PD 12 may employ multiple resistor values as well as a switch to selectively present the signatures to the cable 14. When such a PD 12 is designed specifically to provide this signaling functionality, then the functionality can be included as part of the POE circuitry of the PD 12. Specifically, the POE circuitry would include first signature circuitry that presents a valid PD signature to the powered communications interface, and second signature circuitry operative when the PD is not receiving the normal operating power from the PSE to generate a signal to the powered communications interface indicating that the normal operating power should be delivered to the PD via the powered communications interface.

In some cases, however, it may be desirable to realize the above-described signaling functionality in a system employing a PD 12 that has not been specifically designed for it. For example, there are a wide variety of existing POE PDs, such as IP telephones, IP video cameras, etc., that only provide the one 25 kOhm signature specified by the POE standard, and lack any capability to select among different signatures so as to effect signaling of the type described above.

Figure 3:
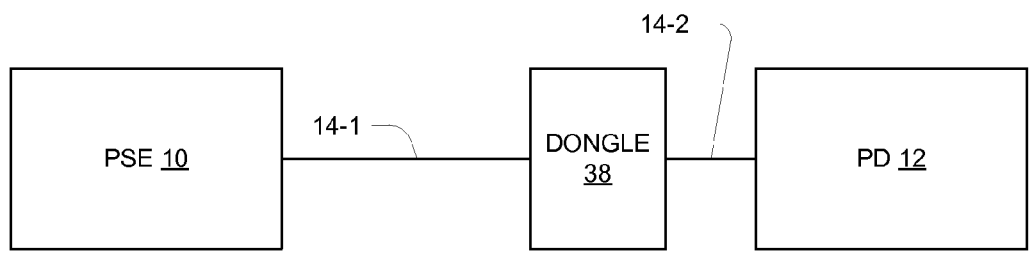
FIG. 3 is a block diagram of a system similar to FIG. 1 but employing a pluggable device termed a "dongle"

FIG. 3 shows a system configuration that can be employed to effect the desired signaling when using such an existing PD 12 that lacks the signaling capability. An intermediate device referred to as a "dongle" 38 is inserted between the PSE 10 and PD 12. The dongle 38 is so named because in at least some embodiments it has a solid body portion and a flexible cable portion that attaches to the PD 12, as described below. In at least some embodiments, the dongle 38 is passive with respect to the high-speed Ethernet communications that pass between the PSE 10 and PD 12 on series-connected cable segments 14-1 and 14-2, and also may be passive with respect to the DC power that flows from the PSE 10 to the PD 12 on the same cable segments. However, the dongle 38 includes at least the ability to generate signals on the cable 14-1 of the type described above that can be recognized by the PSE 10 for purposes of indicating the presence of a user etc. One benefit of the dongle 38 as a separate device is the ability to add the signaling capability in an incremental manner to installed/deployed systems which include PDs 12 that lack such functionality, as mentioned.

Figure 4A:
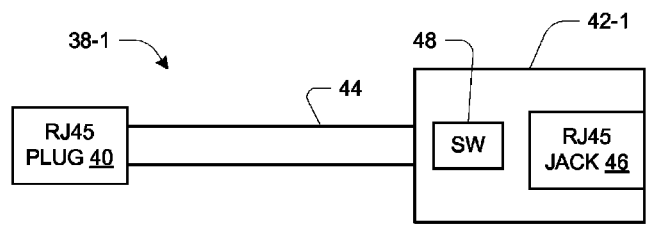
FIGS. 4(a), 4(b) and 4(c) are block diagrams of dongles that may be used in the system of FIG. 3.
Figure 4B:
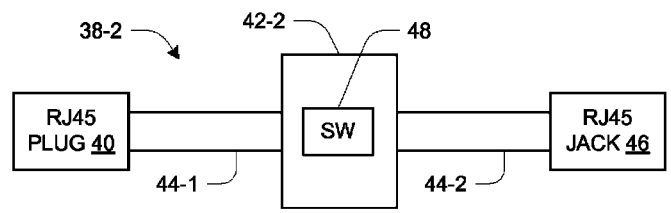
Figure 4C:
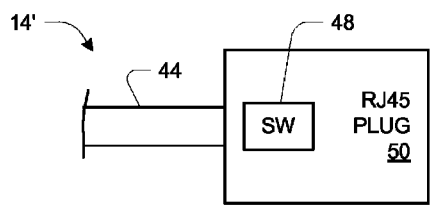

FIG. 4 illustrates several examples of intermediate devices that may be used with such an existing PD 12 to provide the ability to generate multiple signatures such as described above. FIGS. 4(*a*) and 4(*b*) show two alternative arrangements of a dongle 38 which may be inserted between the PSE 10 and the PD 12, and FIG. 4(*c*) shows a modified cable 14' that may be used instead of a normal Ethernet cable 14.

Referring to FIG. 4(*a*), a first dongle 38-1 includes an RJ45 plug 40 connected to a first dongle body 42-1 by a length of Ethernet cable 44. The first dongle body 42-1 includes an RJ45 jack 46 and a switch 48. The switch 48 may be of a variety of types including pushbutton and cantilever, and may provide momentary contact or latching contact (similar to a house light switch). In use, the PD end of an existing cable 14 is plugged into the RJ45 jack 46, and the RJ45 plug 40 is plugged into the PD 12. When a user desires to generate the above-described signaling, he or she activates the switch 48 (such as by momentarily depressing it or otherwise toggling its position). An example schematic for the first dongle body 42-1 is given below.

FIG. 4(*b*) shows a second dongle 38-2 which differs from the first dongle 38-1 by removing the RJ45 jack 46 from the second dongle body 42-2. The RJ45 jack 46 is instead attached to the second dongle body 42-2 by a second length of Ethernet cable 44-2.

FIG. 4(*c*) shows a custom cable 14' which employs a special RJ45 plug 50 which includes the switch 48. The plug 50 may have a physical shape differing from standard RJ45 plugs as necessary to accommodate the switch 48. For example, it may be longer and/or wider over at least a part of the plug body, while retaining physical compatibility with a standard RJ45 jack so as to make proper connection to the PD 12.

Figure 5:
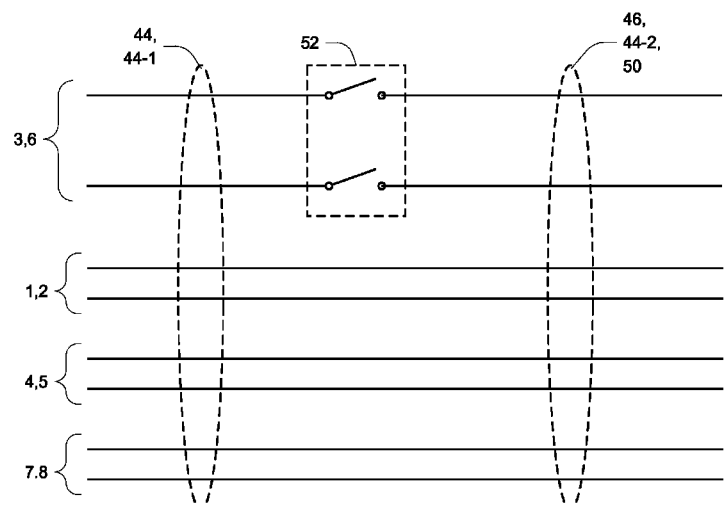
FIGS. 5 through 8 are schematic diagrams of alternative switch circuitry that may be employed as part of a dongle.

FIG. 5 illustrates the wiring of the dongle body 42-1, the dongle body 42-2, or the plug 50 according to one embodiment. A single throw double-pole switch 52 is connected in series with the two wires of the POE channel, e.g., pair 3,6 as shown. When the switch 52 is in a normally closed position, and end-to-end connection is made for each wire of the pair, and when the switch 52 is in an open position (as shown) the end-to-end connection is broken. It is assumed that the PD 12 provides the standard 25 kOhm signature resistance when the switch 52 is in the closed position. When the switch is in the open position, the signature changes to an "open" or infinite resistance, which can be specifically detected by the PSE 10 in steps 34-36 of the process of FIG. 2. It will be appreciated that this condition may be similar to unplugging the cable 14 from the PSE 10.

In alternative embodiments, it may be useful to include an indicator such as a light-emitting diode (LED) on the dongle body 42-1 or 42-2 or the plug 50. The system can use the LED to indicate when power is being withheld pursuant to the power-management policy, so that a user can easily determine when it is necessary to generate the signaling to override the policy.

Figure 6:
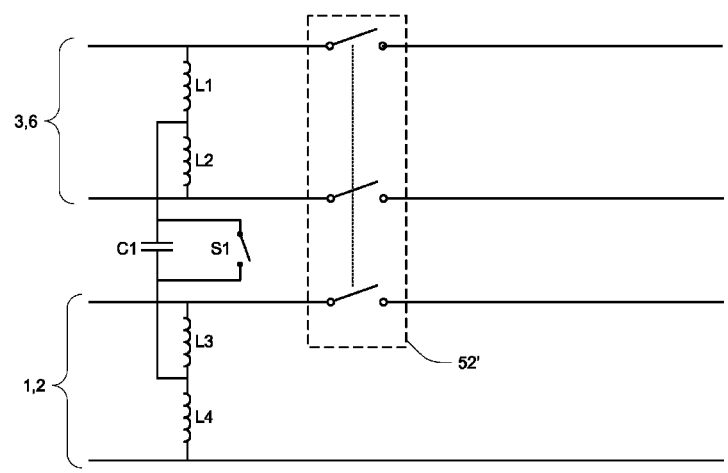

FIG. 6 shows an alternative arrangement for the dongle body 42 or the plug 50. The switch 52' not only isolates both connections of the pair 3,6 but also one connection of the pair 1,2.

In FIG. 6, the switch SI causes a standard-based PSE 10 to see a momentary short-circuit when closed. In operation, the PSE would see a sequence of 25 kOhms, short, 25 kOhms.

The switch 52' can be used to cause an open-circuit for a standard PSE by breaking the end-to-end connection on pair 3,6 for example. It can also effect signaling to a PSE 10 using PHY-based detection (single pair or pair-pair (differential-mode) PHY detection, such as described below. Although only one switch is shown on pair 1,2, it is possible to use two switches such as shown on pair 3,6. Also, although not shown in FIG. 6, the other pairs 4,5 and 7,8 may have similar switch circuits or their connections may go right through the dongle as shown in FIG. 5.

The arrangement of FIG. 6 can provide both "common-mode" as well as "differential-mode" signaling, which may be advantageous if the dongle 38 is to be used with different types of PSEs 10 that utilize different detection mechanisms. When detection is of the "common-mode" type based on DC detection waveforms such as discussed above, the isolation of the pair 3,6 changes the common-mode signature to that of an open circuit. "Differential-mode" detection involves PHY circuitry sending an AC detection signal in a differential manner down one pair (e.g., 3,6) and detecting a loopback of the detection signal on another pair (e.g., 1,2). The signature for this type of detection is altered by isolating wires 3 and 1 for example. Single pair detection involves PHY circuitry sending an AC signal down one pair and measuring the changes that occur to the sent signal. Local communication between the PSE 10 and the detecting PHY circuitry is used to inform the PSE 10 of the detection status and enable normal powering of the attached PD.

Figure 7:
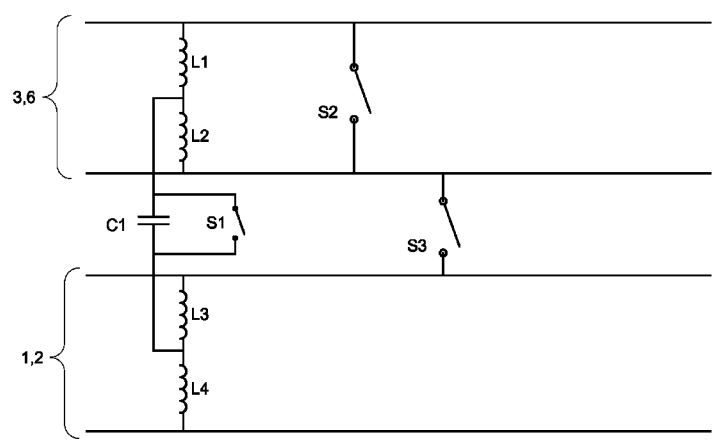
Figure 8:
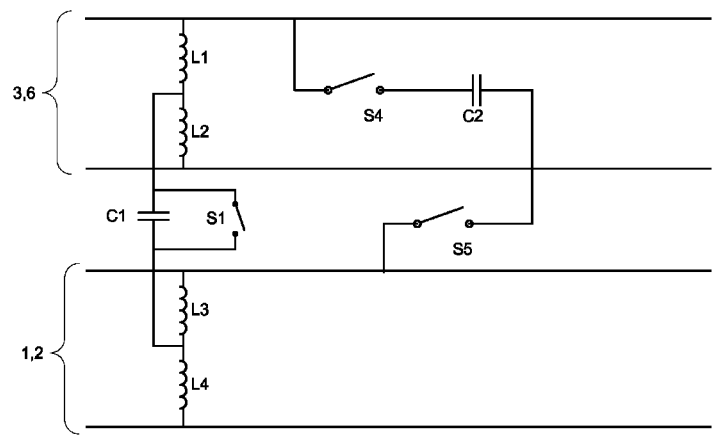

FIGS. 7 and 8 show additional alternative arrangements that might be employed for the dongle body 42 or plug 50. In the arrangement of FIG. 7, the switches S1, S2 and S3 can be separate or a single switch supporting multiple PSE configurations for detecting a PD. Switch S1 is used to change the signature to a standard compliant PSE (25 k resistor in the PD) from 25 k to a short and back to 25 k again. Switch S1 creates a short-circuit between respective pairs when the switch S1 is activated, which can be detected in the PSE 10. When PHY based detection is active (e.g., single pair detection is active, TDR based PHYs can do this today), the pair impedance is changed from 100 ohms to a short to 100 ohms again using switch S2. Also activating S2 and S3 at once provides the same function as activating S1, to a standard based PSE 10 looking for a 25 k ohm resistance since the pairs supplying power are shorted. In a similar manner activating S2 and S3 causes a corruption of a differential PHY discovery algorithm that is expecting a full differential loopback from the attached PD 12. In the arrangement of FIG. 8, the capacitor S2 serves to alter or "corrupt" the differential signature when made part of the circuit by closing the switches S4 and S5, and this corrupted differential signature can be detected by the PHY instructing PSE 10 about the detection status. Similar L-C networks or other impedances (zener diodes, inductors, RC networks) may replace C2 to corrupt the differential or single pair detection executed by the attached PHY).

Figure 9:
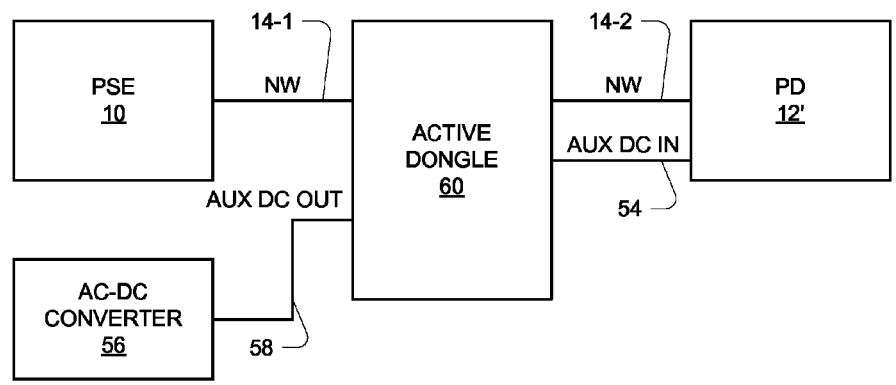
FIG. 9 is a block diagram of a system employing a powered communications interface according to another embodiment of the invention.

FIG. 9 shows another arrangement in which a PD 12' receives power not only from a network (NW) cable 14-2 but also from an auxiliary DC input (AUX DC IN) 54. An AC-DC converter 56 generates an auxiliary DC output (AUX DC OUT) 58 which is compatible with the AUX DC IN 54. The power from the AUX DC OUT 58 is routed through an active dongle 60 for purposes of enabling the power supplied to the PD 12' via the AUX DC IN 54 to be controlled by the active dongle 60, as discussed in more detail below. The AC-DC converter 56 may be a typical device of box-like construction having electrical prongs that mate directly with an AC outlet, sometimes referred to as a "power brick" or simply "brick". It should be noted that in the present context the term "brick" can also refer to a mid-span injector (another POE source). In operation, the PD 12' may receive DC power from either the cable 14-2 or the AUX DC IN 54, depending on the operation of the active dongle 60 as well as the presence/absence of DC power from the PSE 10 and AC-DC converter 56.

The advantage of an arrangement of the type shown in FIG. 9 is that inline power can control an auxiliary power source. If the PD power requirement is too high to be powered from only the inline power source, then the inline power source may act as an ON/OFF switch to such a higher-power PD achieving a more power-efficient network. POE power below 30 v or above 30 v may be used for such control. Also, either a standard POE detection algorithm or a modified algorithm may be used for this control purpose.

Figure 10:
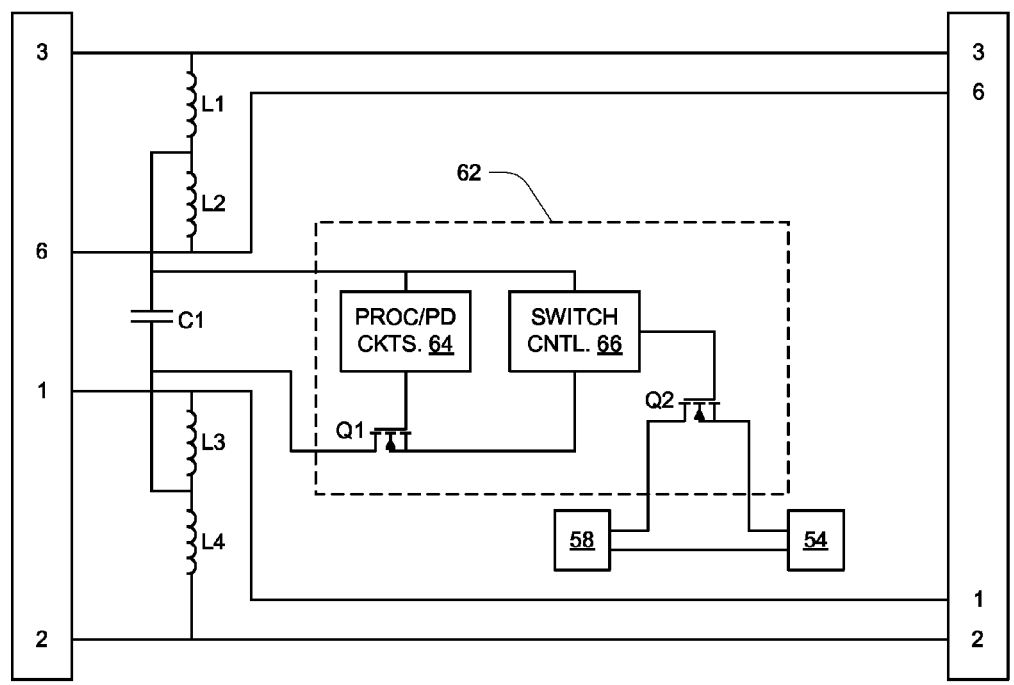
FIGS. 10-11 are schematic diagrams of alternative pluggable devices that can be used in the system of FIG. 9.

FIG. 10 shows a first embodiment 60-1 of the active dongle 60. It includes power control circuitry 62 which incorporates transistor switches Q1 and Q2, processor and PD circuitry (PROC/PD CKTS) 64, and switch control circuitry 66. The transistor Q2 serves to make or break the connection between AUX DC OUT 58 from the AC-DC converter 56 (FIG. 9) and the AUX DC IN 54 to the PD 12', under the control of the switch control circuitry 66. Power to the switch control circuitry 66 is controlled by the transistor Q1, which is under the control of the processor and PD circuitry 64. In the dongle 60-1, the power control circuitry 66 controls only the delivery of auxiliary DC power from the AC-DC converter 56 to the PD 12'. POE power on pairs 3,6 and 1,2 passes through the active dongle 60-1 via the straight-through connections as shown.

Figure 11:
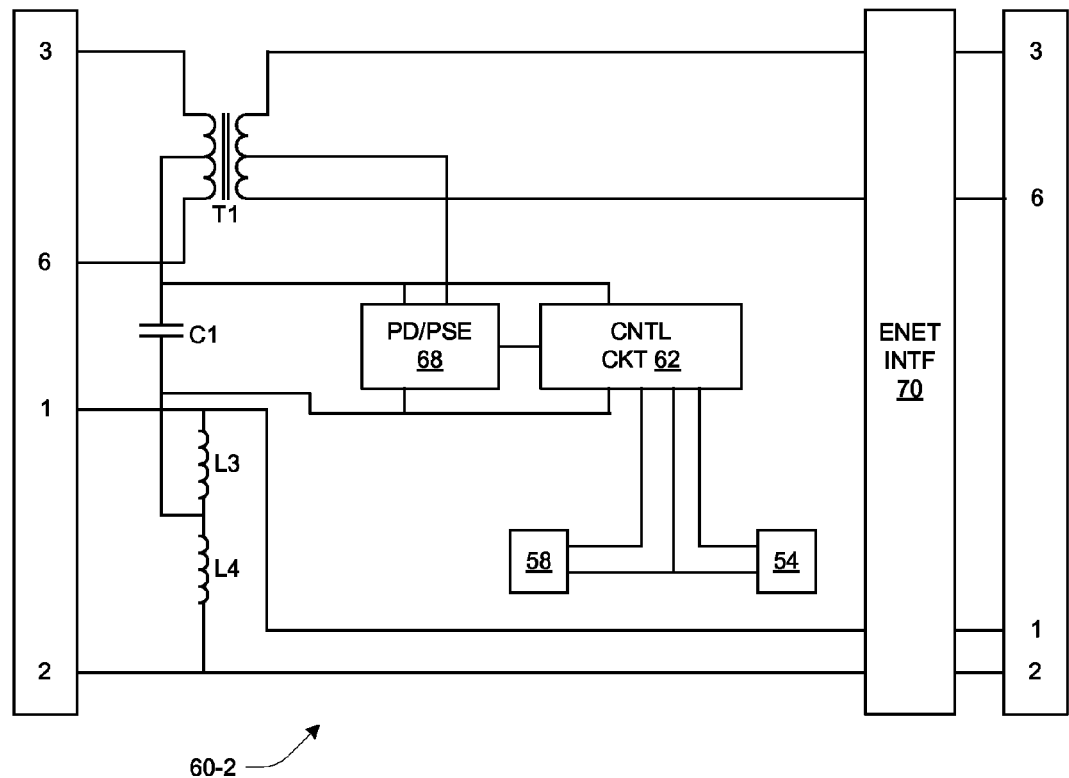

FIG. 11 shows a second embodiment 60-2 of the active dongle 60 that includes circuitry and functionality for controlling POE power delivered via the cable 14-2 as well as controlling the auxiliary DC power. This circuit includes a transformer T1 and PD/PSE circuitry 68 which (a) receives DC power from the PSE 10 via the primary side of T1, and b) provides DC power to the PD 12' via the secondary side of T1. The PD/PSE circuitry 68 form an intermediate PD and an intermediate PSE for controlling the flow of POE power from the PSE 10 to the PD 12. The providing of DC power via T1 can be controlled by power switching circuitry (not shown) within the PD/PSE 68, under control of the control circuitry 62. A local Ethernet interface 70 is optional. If present, it might include a set of relays and a physical-layer circuitry plus memory to re-route Ethernet data to a local data interface for purposes of communicating with local firmware and exchanging power up/down and status management and control data.

A mechanism such as shown in FIG. 11 allows brick power to control POE power, i.e., to make POE power more efficient if necessary. Also, if common mode communications is available to the PSE 10 via the detection mechanism or power modulation algorithm, the brick may be able to communicate with the PSE about status and control and for management. While not shown, an active dongle may be used that has switches similar to the implementation shown above. Also brick power may control POE power on the other set of pairs (not shown here for simplification) in a similar manner. At the same time, in alternate configurations brick power may be used to shut off the POE source while the local circuitry in the dongle draws minimum brick power to provide local intelligence for such purposes. Examples of functions that can be performed using brick power to enhance the POE implementation include isolating the load supplied via the secondary side center tap of T1, corrupting the discovery signature, and providing common mode signaling and communication with the PSE.

It should be noted that control circuit 62 in FIG. 11 may be powered either from the PD/PSE 68 or from the brick 56. It may also be desirable to do both in one.

Figure 12:
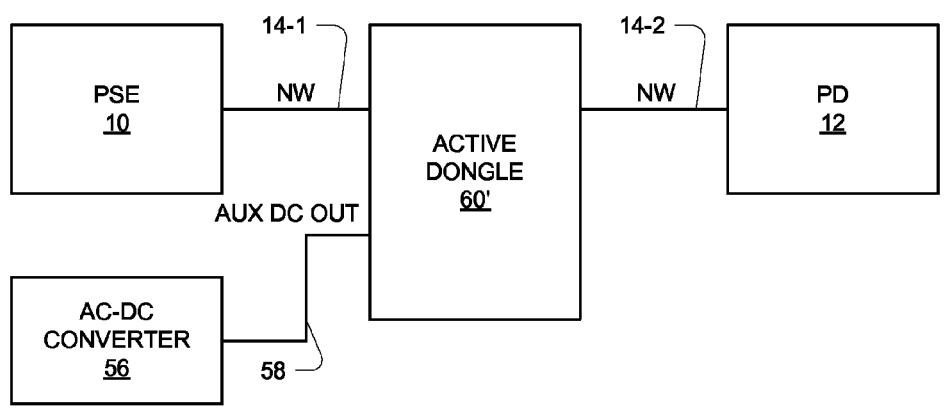
FIG. 12 is a block diagram of a system employing a powered communications interface according to another embodiment of the invention.
Figure 13:
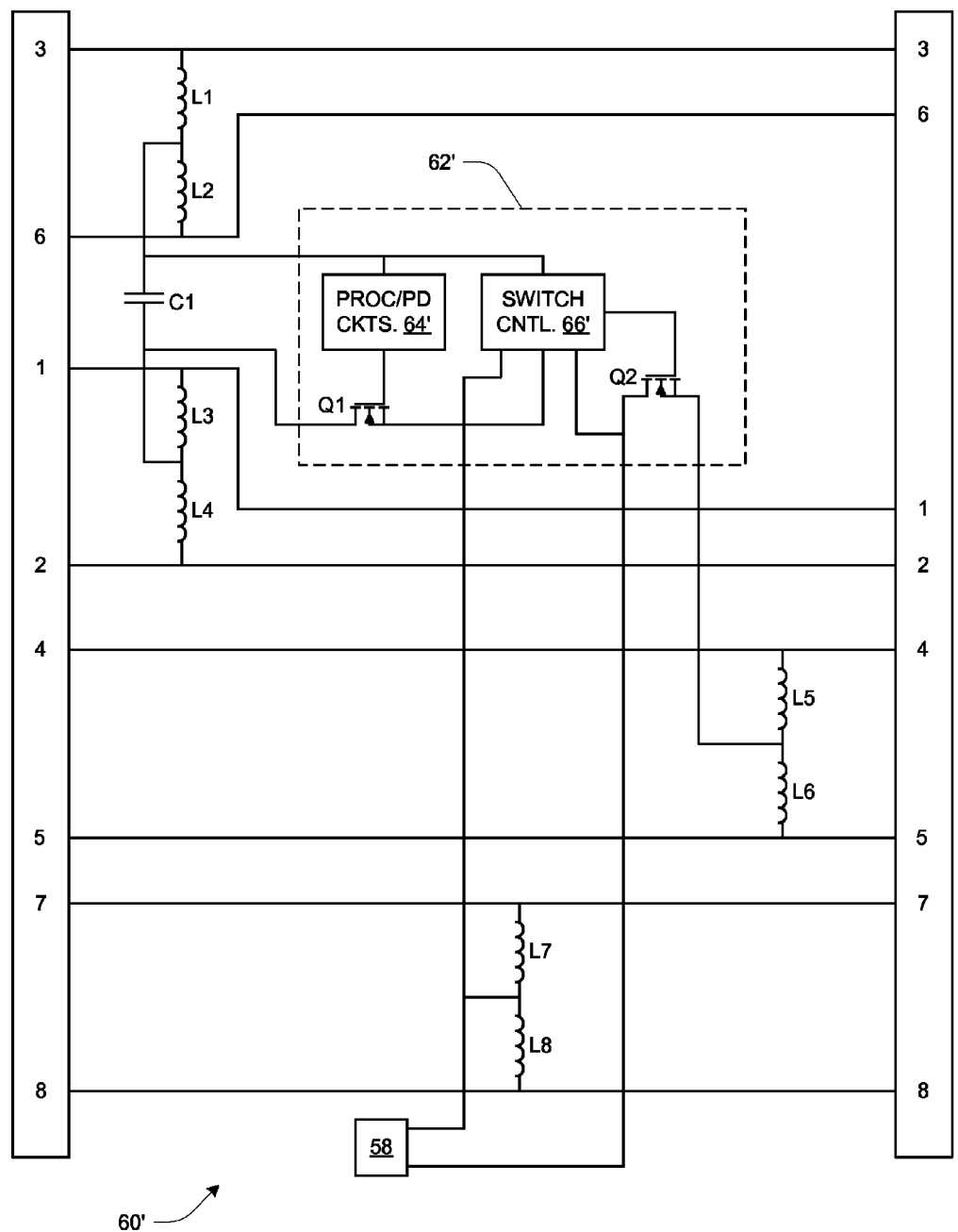
FIG. 13 is a schematic diagram of a pluggable device that can be used in the system of FIG. 12.

FIG. 12 shows yet another arrangement employing an active dongle 60'. In this arrangement, the active dongle 60' receives DC power from the PSE 10 as well as from the AC-DC converter 56, and provides DC power to the PD 12 via only the cable 14-2. An arrangement for the active dongle 60' is shown in FIG. 13. In this case, POE power is provided to the PD 12 via pairs 3,6 and 1,2, while the DC power from the AC-DC converter 56 is provided on pairs 4,5 and 7,8 under the control of control circuitry 62'. The AC-DC converter 56 may be another POE power source. Also it is possible to mix power from both the auxiliary and the PSE source when normal power is active to provide redundant powering and quick switchover of a standby power sources in case one source fails. Also, as shown the control circuit 62' in FIG. 13 may be powered either from the POE or from the brick 56.

As will be appreciated, an active dongle 60 may be a more user-friendly approach to green power-over-Ethernet, and more, it can be used to control brick power as well. The active dongle 60 can be used inline with an Ethernet connection and may or may not have brick control in it. The active dongle 60 draws POE power from the PSE 10 and controls the delivery of power to the PD 12' based on local firmware and user- or network-programmable configurations. It may have a USB or an Ethernet interface locally to deliver configuration data, and once configured it may not require further active configuration unless common mode communications is available or a direct data connection is present. It may be preferred to configure the active dongle 60 with a policy and selectively enable the switches Q1, Q2. Additionally, it might be desirable to include a limited user interface including a display to enable a user to override the policy or set an on/off timer. Such a display could serve as an indicator of the power level, availability, policy messages and status indicators on power and data if needed. Common mode communications may also be used to talk to the device.

Figure 14:
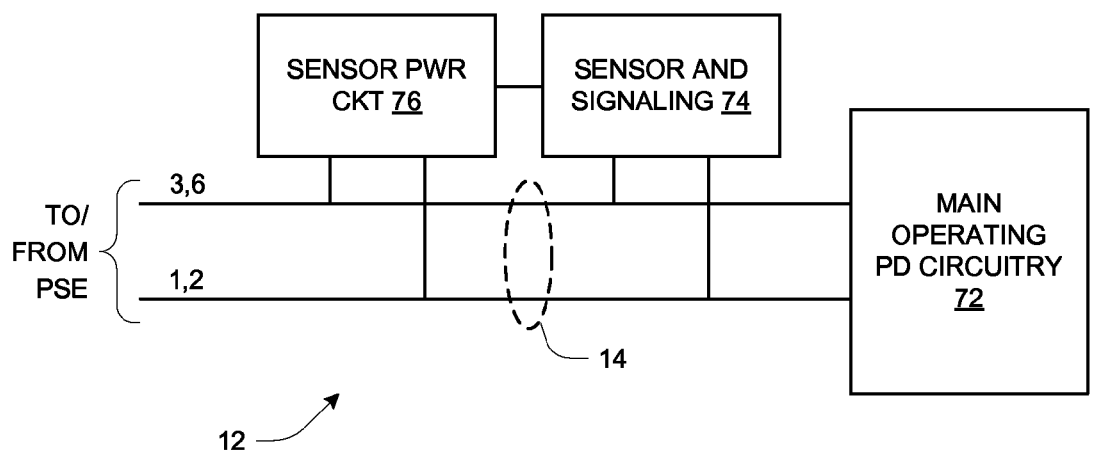
FIG. 14 is a block diagram of a sensor-based powered device that may be used in the system of FIG. 1.

FIG. 14 shows an example of a sensor-based PD 12 such as mentioned above. The PD includes main operating circuitry 72 which may include, for example, a DC-DC converter, PHY circuitry, and other circuitry typical to a specific application (phone circuitry if the PD is a phone, camera circuitry if a camera, etc.). Additionally, sensor and signaling circuitry 74 includes some form of sensor(s) for detecting events of interest in the operating environment, such as motion, light, sound, temperature, etc., along with circuitry that responds to the outputs of such sensor(s) to generate signaling to the PSE 10 via the cable 14 as discussed above. By this operation, sensor-based device classes can be realized that can be powered based on patterns of sensed values rather than on a specific human input such as via a push-button. For example, a camera or similar monitoring PD 12 can be powered only when there is a sufficiently high level of visible light, and otherwise powered down. Or devices can be maintained in a powered down condition until a certain level or duration of motion is detected. There are numerous potential applications and configurations employing such sensor-based operation.

A sensor power circuit 76 is used to provide power to the sensor and signaling circuitry 74. The sensor power circuit 76 could be as simple as a battery. In some cases, depending on the amount of power required for sensor operation, it may be possible to draw sufficient energy from the electrical signals on the cable 14 itself to power the sensor. In such a case, the sensor power circuit 76 is connected to the cable 14 as shown, and is operative to draw power from the cable 14, store the power as required, and provide the stored power to the sensor and signaling circuitry 74. Such embodiments might typically employ either a rechargeable battery, one or more capacitors, or other forms of electrical energy storage. To enable sensor operation for a prolonged period during which normal operating power (e.g., 48-volt power) is being withheld, the PSE 10 preferably generates detection and classification voltages and currents in infinite repetition, and the sensor power circuitry is able to capture and store the energy in these signals. It may be desirable for the PSE 10 to withhold normal operating power (48 volts) while providing more power than is currently permitted by the POE standards. As an example, the PSE 10 might provide a voltage of about 5 volts and a current on the order of tens of milliamps, the current standard allows for no more than 10 v across the PD and a maximum of 5 ma current to be drawn during detection.

Although FIG. 14 and the above description assume that control over full 48-volt operating power to the main PD circuitry 72 is exercised by the PSE 10 responsive to the signaling from the sensor and signaling circuitry 74, as an alternative the PSE 10 might provide 48 volt power and the PD 12 locally control its application to the load responsive to such signaling.

What is claimed is:

1. A system, comprising:
   a power-sourcing equipment (PSE) having a powered communications interface via which the PSE can deliver normal operating power; and
   a powered device (PD) coupled to the powered communications interface of the PSE by a power delivery channel having two wire pairs, the PD being operative to present a valid PD signature to the two wire pairs indicating that the PD is attached and able to receive the normal operating power from the PSE via the two wire pairs;
   the PSE being operative (i) in accordance with a power-withholding policy, to operate in a power-withholding state in which the PSE (a) withholds the normal operating power from the two wire pairs notwithstanding the presentation of the valid PD signature by the PD to the two wire pairs, and (b) monitors for the receipt of a signal via the two wire pairs indicating that the normal operating power should be delivered to the PD via the two wire pairs, and (ii) in response to receiving the signal in the power-withholding state, to enter a power-providing state in which the PSE provides the normal operating power to the PD via the two wire pairs notwithstanding the power-withholding policy.

2. A system according to claim 1, wherein the signal comprises a sequence of varying resistance values.

3. A system according to claim 1, wherein the signal comprises a sequence of varying classification current values.

4. A system according to claim 1, wherein the signal comprises a sequence of varying single pair identity networks using physical-layer communications based detection.

5. A system according to claim 1, wherein the signal comprises a sequence of varying pair-pair differential identity networks using physical-layer communications based detection.

6. A system according to claim 1, wherein:
   the PSE is also operative in accordance with a power-providing policy to provide the normal operating power to the PD based on the presentation of the valid PD signature to the PSE by the PD; and
   the PSE is further operative in the power-withholding state, if the power-providing policy is in place, to (i) refrain from withholding the normal operating power and monitoring for the receipt of the signal, and (ii) enter the power-providing state.

7. A system according to claim 1, wherein the PD is not capable of generating the signal indicating that the normal operating power should be delivered, and further comprising an intermediate device coupled between the PD and the powered communications interface of the PSE, the intermediate device being operative to generate the signal on the two wire pairs based on a corresponding local condition at the intermediate device.

8. A system according to claim 7, wherein the intermediate device comprises a user-activated switch and the local condition comprises a state of the user-activated switch.

9. A system according to claim 7 wherein:
the PD is further operative to receive auxiliary operating power from an auxiliary power input; and
the intermediate device includes power control circuitry operative to control the flow of power from an auxiliary power device to the auxiliary power input of the PD.

10. A system according to claim 9, wherein the intermediate device further includes PD/PSE circuitry operative to form an intermediate PD and intermediate PSE for controlling the flow of the normal operating power from the two wire pairs to the PD.

11. A system according to claim 1, wherein the PD includes sensor and signaling circuitry operative to (i) detect an event of interest in an operating environment of the PD and (ii) generate the signal based on detecting the event of interest.

12. A power-sourcing apparatus, comprising:
power circuitry of a powered communications interface to a power delivery channel to a powered device (PD), the power delivery channel including two wire pairs, the power circuitry being operative (i) to deliver normal operating power to the PD via the two wire pairs, and (ii) to detect a valid PD signature presented to the two wire pairs indicating that the PD is attached and capable of receiving the normal operating power from the power-sourcing apparatus via the two wire pairs; and
control circuitry operative (i) in accordance with a power-withholding policy, to operate in a power-withholding state in which the power-sourcing apparatus (a) withholds the normal operating power from the two wire pairs notwithstanding the presentation of the valid PD signature to the two wire pairs, and (b) monitors for the receipt of a signal via the two wire pairs indicating that the normal operating power should be delivered to the two wire pairs, and (ii) in response to receiving the signal in the power-withholding state, to enter a power-providing state in which the power-sourcing apparatus provides the normal operating power to the PD via the two wire pairs notwithstanding the power-withholding policy.

13. A power-sourcing apparatus according to claim 12, wherein:
the PSE is also operative in accordance with a power-providing policy under which the PSE provides the normal operating power to the two wire pairs based on the presentation of the valid PD signature to the PSE by the PD via the two wire pairs; and
the PSE is further operative in the power-withholding state, if the power-providing policy is in place, to (i) refrain from withholding the normal operating power and monitoring for the receipt of the signal, and (ii) enter the power-providing state.

14. A power-sourcing apparatus according to claim 12, wherein the power-withholding policy is selected from a group of power management policies each having different criteria for withholding the normal operating power from the PD, the different criteria being selected from the group consisting of time-based criteria, calendar-based criteria, activity-based criteria, and sensor-based criteria.

15. A power-sourcing apparatus according to claim 12, wherein the signal comprises a sequence of varying resistance values.

16. A power-sourcing apparatus according to claim 15, wherein the resistance values are selected from the group consisting of a short circuit, an open circuit, and a signature resistance value corresponding to the valid PD signature.

17. A power-sourcing apparatus according to claim 15, wherein the resistance values are selected from any resistor value and a signature resistance value corresponding to the valid PD signature.

18. A power-sourcing apparatus according to claim 12, wherein the signal comprises a sequence of varying classification current values.

19. A powered device (PD) for coupling to a powered communications interface of a power-sourcing equipment (PSE) by a power delivery channel having two wire pairs, the PSE being operative to deliver normal operating power to the PD via the two wire pairs, comprising:
first signature circuitry operative to present a valid PD signature to the two wire pairs indicating that the PD is attached and capable of receiving the normal operating power from the PSE; and
second signature circuitry operative when the PD is not receiving the normal operating power from the PSE notwithstanding the presentation of the valid PD signature by the PD, to generate a signal to the two wire pairs indicating that the normal operating power should be delivered to the PD via the two wire pairs.

20. A powered device according to claim 19, wherein the signal comprises a sequence of varying resistance values.

21. A powered device according to claim 20, wherein the resistance values are selected from the group consisting of a short circuit, an open circuit, and a signature resistance value corresponding to the valid PD signature.

22. A powered device according to claim 20, wherein the resistance values are selected from any resistor value and a signature resistance value corresponding to the valid PD signature.

23. A powered device according to claim 19, wherein the signal comprises a sequence of varying classification current values.

24. A powered device according to claim 19, further comprising sensor and signaling circuitry operative to (i) detect an event of interest in an operating environment of the PD and (ii) generate the signal based on detecting the event of interest.

25. A powered device according to claim 24, wherein the sensor and signaling circuitry includes a sensor selected from a group consisting of motion, light, sound and temperature.

26. An intermediate device for use in a system including a power-sourcing equipment (PSE) and a powered device (PD), the PSE having a powered communications interface via which the PSE can deliver normal operating power to the PD, comprising:
connectors and internal connections operative to form a power delivery channel to electrically couple the powered communications interface of the PSE to the PD to permit (i) the flow of the normal operating power from the PSE to the PD via two wire pairs of the power delivery channel, and (ii) the presentation of a valid PD signature to the two wire pairs indicating that the PD is attached and capable of receiving the normal operating power from the PSE via the two wire pairs; and a user-activated switch operative to generate a signal on the two wire pairs based on a corresponding local condition at the intermediate device, the signal indicating that the PSE should enter a power-providing state in which the PSE provides the normal operating power to the PD on the two wire pairs notwithstanding a power-withholding policy by which the PSE normally withholds the normal operating power from the two wire pairs.

27. An intermediate device according to claim 26, being a dongle having a dongle body and a length of flexible cable, the dongle body including a network connection jack for receiving a standard network connection plug of a network cable from the PSE, the length of flexible cable including a corresponding standard network connection plug for mating with a standard network connection jack of the PD.

28. An intermediate device according to claim 26, wherein the PD is further operative to receive auxiliary operating power from an auxiliary power input, and further comprising:

power control circuitry operative to control the flow of power from an auxiliary power device to the auxiliary power input of the PD.

29. An intermediate device according to claim 26, further comprising an indicator operative to indicate whether power is being supplied to the PD by the PSE.

30. An intermediate device according to claim 26, further comprising a network cable having a specialized network connection plug at one end, the specialized network connection plug mating with a standard network jack and including the user-activated switch.

31. An intermediate device according to claim 26, further comprising power storage circuitry.

32. An intermediate device according to claim 31, wherein the power storage circuitry includes a capacitor operative to store energy provided by the PSE.

33. An intermediate device according to claim 26, further comprising power control circuitry operative to control the flow of power from an auxiliary power device to an auxiliary power input of the PD.

34. An intermediate device according to claim 33, further comprising PD/PSE circuitry operative to form an intermediate PD and intermediate PSE for controlling the flow of the normal operating power from the two wire pairs to the PD.

* * * * *